UNITED STATES PATENT OFFICE.

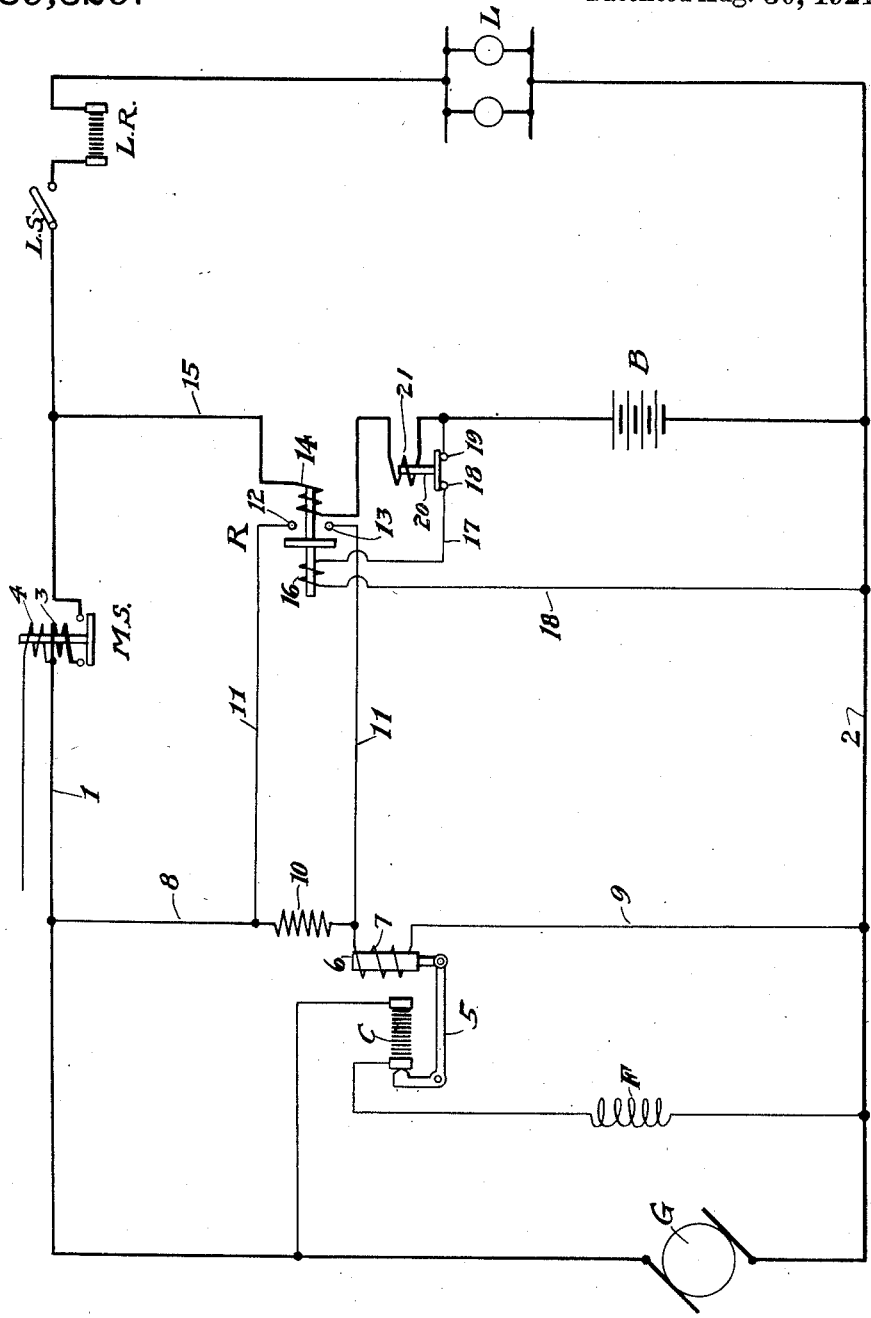

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,329.      Specification of Letters Patent.      Patented Aug. 30, 1921.

Application filed September 19, 1919. Serial No. 325,003.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and is more particularly directed to an improved railway car lighting system including an axle-driven generator and a battery adapted for connection to be charged thereby, and lamps adapted for connection to be supplied by the generator or by the battery and electro-responsive regulating means for the generator governed in accordance with the condition of the battery current.

It is one of the objects of the invention to provide a simplified and improved system of the character mentioned wherein the generator regulator, during effectiveness, acts with a tendency to maintain relative constancy of generator voltage (as against speed changes and as against changes in the state of battery charge) at one of a plurality of voltage values determined by means responsive to battery charging current and relatively indicative of the state of battery charge.

A further object is to provide an improved system of the character mentioned which possesses features of structural superiority and functional advantage.

Other objects and advantages will be in part noted hereinafter in connection with the following description of the accompanying drawing, which illustrates a typical, but preferred, embodiment of the invention and wherein is represented a simplified wiring diagram showing the electrical connections of the various elements employed.

In general, there is represented an axle-driven variable speed generator G having a shunt field winding F, which latter has in series therewith a variable regulating resistance, such as a carbon pile C. The generator is adapted for connection by lines 1 and 2 with a storage battery B and lamps L. A well-known form of main switch MS may be provided in line 1 to control the continuity thereof in accordance with the action of a current coil 3 and a voltage coil 4 so designed as to connect the generator with the translating devices when and while the voltage of the generator exceeds a predetermined value and to disconnect the generator when such voltage passes below a predetermined value. A lamp switch LS may be provided between the battery and lamps and individual switches for the separate lamps may also be present where desired. A lamp regulator LR including a variable resistance is also provided to govern the value of voltage constancy applied to the lamps during the period of current delivery to the latter from the generator or from the battery.

The degree of compression of the carbon pile C, and therefore the relative strength of the field winding F of the generator, is controlled by a bell crank lever 5 having connected thereto a core 6, the position of which is governed by an electro-responsive voltage coil 7 connected across the lines 1 and 2 by leads 8 and 9. It has heretofore been proposed to regulate a generator connected to charge a battery, by a voltage coil acting to maintain relative constancy of generator voltage at one level during the entire period of battery charging. Defects, however, have resided in such proposed systems and have heretofore prevented the successful utilization thereof. One such defect has been that if the regulating coil is designed to maintain generator voltage constancy at a level high enough to insure a full battery charge, then, at the beginning of charge, or with a lowered counter E. M. F. of the battery, an objectionably excessive charging current is supplied to the battery; whereas, if the regulating coil is designed to maintain relative generator voltage constancy at a value low enough to restrict the charging current to a depleted battery within desirable limits, then such voltage value has too rapidly tapered the charging current on account of the rising C. E. M. F. of the battery as the charge progresses, and a complete battery charging is not effected.

To overcome the defects thus noted, among others, by the present invention the setting of the voltage regulating coil 7 is established to maintain generator voltage constancy at a predetermined lower value when and while the counter E. M. F. of the battery is such that too high a charging current would be delivered at the value of voltage constancy desirable toward the end of charging to a normal battery, and the voltage regulating coil 7 is set to maintain generator voltage constancy at a higher predetermined value when the counter E. M. F. of the battery itself affords a safeguard against an excessive charging current. As shown, there is provided, in the lead 8, an element of resistance 10 adapted for inclusion, under certain conditions, in series with the coil 7 for weakening the effectiveness of the latter and thereby raising the value of the generator voltage constancy maintained; and adapted, under other conditions, for exclusion from the circuit of the regulating coil to relatively strengthen the latter, and thereby decrease the value of generator voltage constancy maintained. Resistance 10 consequently is provided with a shunt 11 thereabout, including contacts 12 and 13, governed by a relay R. This relay is of a character whereby the switch element thereof is adapted to maintain its instant limit of position until acted upon by a relay overload coil 14 connected in series with battery branch lead 15 on the one hand, or by a relay coil 16 adapted for connection by lines 17 and 18 across the battery. Line 17 includes contacts 18 and 19 governed by a switch 20, the position of which, to open or close the line 17, depends on the strength of an underload coil 21, also connected in series with the battery in lead 15.

With one design of the parts and connections outlined, the functional working of the system may be described briefly as follows: Assuming the train at rest or the voltage of the generator below a predetermined value so that the main switch MS is open, no charging current will be delivered to the battery and coil 21 (which may be set to drop the relay switch element 20 when, say, less than twenty amperes current is supplied to the battery), causes the closure of lead 17 across contacts 18 and 19, and effects the energization of the coil 16 of relay R so that the latter responds to break the circuit of the shunt 11 across contacts 12 and 13 and thereby includes resistance 10 in series with the regulating coil 7. The regulating coil is thus set in its weakened condition, whereby the re-building of the generator voltage on re-starting and acceleration of the train is expedited and the re-closure of the main switch MS therefor effected with a minimum delay. Upon such re-closure of the main switch a charging current will be delivered to the battery in an amount dependent on the condition of the latter; that is, its C. E. M. F. opposing the applied voltage of the generator which, at the instant setting of regulating coil 7, may be, say, forty volts. Assuming first that at this time the battery is in a depleted condition so that, at such higher generator voltage an excessive current inrush to the battery would tend to ensue, coil 21 lifts switch 20 to open the circuit of coil 16 and then coil 14 is strengthened (being designed as an overload coil and set to actuate relay R upon the passage of, say, sixty amperes charging current) and responds to effect closure of the shunt 11 across contacts 12 and 13 and exclude resistance 10 from the circuit of the regulating coil 7, whereby the regulator is again set to maintain constancy of generator voltage at a predetermined lower level, say thirty-five volts, at which a charging current is supplied below that necessary to effectively energize coil 14 and above that necessary to permit coil 21 to release the switch element 20. This condition will obtain until the battery charge has progressed sufficiently to raise the counter E. M. F of the battery with an attendant tapering of the charging current until the latter passes below the value for which the coil 21 is set, whereupon switch element 20 completes the circuit of the coil 16 and the relay R responds to re-include the resistance 10 in series with regulating coil 7 and the regulator thereafter acts, during the continuance of charging, to maintain relative constancy of generator voltage at a higher level, say forty volts, which insures the adequate completion of the battery charging without, however, entailing an injurious overcharge to a normal battery. Assuming, second, that at the time main switch MS is open and the resistance 10 consequently damping the effect of coil 7, the battery is in a major state of charge; then, on a resumption of generator effectiveness and re-closure of the main switch, the generator voltage maintained at say forty volts is correct, since the then condition of the counter E. M. F. of the battery affords its inherent protection against too heavy inrush, the coil 14 remains idle, and the regulation is continued unchanged at the higher level of voltage constancy with the battery current gradually tapering to afford its inherent protection against overcharge.

It will be observed that the regulation is at all times effected solely by the voltage coil 7 and the setting of the latter is governed in accordance with the needs of the system; and it is to be understood that certain features of the invention are susceptible of modification and combination with systems wherein the generator regulator may assume various other forms, and that such modifications and combinations may be attendant advantages of the present invention and without departure from the scope of the appended claims.

Having described my invention, what I claim as new and desire to secure by Letters Patent is:

1. In a car lighting system, in combination, a variable speed generator, a battery adapted for connection to be charged thereby, a regulator for said generator including a voltage responsive coil connected across the generator mains, an element of fixed resistance in series with said coil, and automatic means responsive to battery charging current and operable upon the deliverance of said current in excess of a predetermined amount to shunt said resistance and operable upon the deliverance of battery charging current less than a predetermined lower amount to open the shunt about said resistance.

2. In combination, a variable speed generator, a battery adapted for connection to be charged thereby, a regulator for said generator including a voltage responsive coil connected across the generator mains and effective to maintain relative constancy of generator voltage as against speed changes and as against changes in the state of battery charge, and automatic means including a current overload coil and a current underload coil acting to affect said regulator for lowering the value of voltage constancy maintained thereby and for raising the value of voltage constancy maintained thereby upon the deliverance of charging current respectively above a predetermined high value and below a predetermined low value.

3. In combination, a variable speed generator, a battery adapted for connection to be charged thereby, a regulator for the generator comprising electro-responsive means to maintain relative constancy of generator voltage as against speed changes and as against changes in the state of battery charge at all times, and a controller for said electro-responsive means comprising a series coil in the battery branch operative to affect said electro-responsive means to insure the maintenance by the latter of generator voltage constancy at a relatively lower value under certain conditions, and a series coil in the battery branch to affect said electro-responsive means for insuring the maintenance of generator voltage by the latter at a relatively high value under other conditions.

4. In combination, a variable speed generator, a storage battery adapted for connection to be charged thereby, a regulator comprising a voltage responsive coil connected across the generator mains and tending when effective to maintain relative constancy of generator voltage as against speed changes and as against changes in the state of battery charge, a resistance adapted for inclusion in the circuit of said coil to raise the value of voltage constancy maintained thereby and for exclusion from said circuit to depress the value of voltage constancy maintained thereby, a current overload coil in the battery branch acting upon the deliverance of charging current above a predetermined relatively high value to effect the exclusion of said resistance from the circuit of said coil, and a current underload coil in the battery branch acting upon the deliverance of charging current less than a predetermined relatively lower value to effect the inclusion of said resistance in the circuit of said coil.

5. In combination, a variable speed generator, a battery adapted for connection to be charged thereby, a regulator for said generator comprising a voltage responsive coil connected across the generator mains and acting to maintain relative constancy of generator voltage as against speed changes and as against changes in the state of battery charge, automatic electro-responsive means to insure the maintenance of a relatively low value of generator voltage constancy by said coil during the periods of relatively low counter E. M. F. of the battery and to insure the maintenance of a relatively high generator voltage constancy by said coil during periods of relatively high counter E. M. F. of said battery and to insure a minimum opposition of said coil to the increase of generator voltage from zero to a predetermined value.

In testimony whereof I affix my signature, in the presence of two witnesses.

LEONARD A. WATSON.

Witnesses:
  HELEN M. SEAMANS,
  DAVID A. WOODCOCK.